US011158059B1

(12) United States Patent
Plawinski et al.

(10) Patent No.: US 11,158,059 B1
(45) Date of Patent: Oct. 26, 2021

(54) IMAGE RECONSTRUCTION BASED ON EDGE LOSS

(71) Applicant: INTERNATIONAL BUSINESS MACHINES CORPORATION, Armonk, NY (US)

(72) Inventors: Jason Marc Plawinski, Thann (FR); Daiki Kimura, Tokyo (JP); Tristan Matthieu Stampfler, Strasbourg (FR); Subhajit Chaudhury, Kawasaki (JP); Asim Munawar, Ichikawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 16/838,349

(22) Filed: Apr. 2, 2020

(51) Int. Cl.
*G06K 9/00* (2006.01)
*G06T 7/13* (2017.01)
*G06T 5/00* (2006.01)

(52) U.S. Cl.
CPC ............... *G06T 7/13* (2017.01); *G06T 5/002* (2013.01); *G06T 2207/20081* (2013.01); *G06T 2207/20084* (2013.01)

(58) Field of Classification Search
CPC . G06T 7/13; G06T 5/002; G06T 2207/20081; G06T 2207/20084
USPC ........................................................ 382/156
See application file for complete search history.

(56) References Cited

U.S. PATENT DOCUMENTS

2018/0307947 A1 10/2018 Choi et al.

FOREIGN PATENT DOCUMENTS

CN 108334904 7/2018

OTHER PUBLICATIONS

Li, Yi, et al. "Anti-makeup: Learning a bi-level adversarial network for makeup-invariant face verification." Proceedings of the AAAI Conference on Artificial Intelligence. vol. 32. No. 1. 2018. (Year: 2018).*
Dou, Hao, et al. "Asymmetric CycleGan for unpaired NIR-to-RGB face image translation." ICASSP 2019-2019 IEEE International Conference on Acoustics, Speech and Signal Processing (ICASSP). IEEE, 2019. (Year: 2019).*
Isola, Phillip, et al. "Image-to-image translation with conditional adversarial networks." Proceedings of the IEEE conference on computer vision and pattern recognition. 2017. (Year: 2017).*
Lin, Jianxin, et al. "Conditional image-to-image translation." Proceedings of the IEEE conference on computer vision and pattern recognition. 2018. (Year: 2018).*

(Continued)

*Primary Examiner* — Jonathan S Lee
(74) *Attorney, Agent, or Firm* — Tutunjian & Bitetto, P.C.; Randall Bluestone

(57) ABSTRACT

Edge-Loss-based image construction is enabled by a method including generating a reconstructed image from a first edge image with a generator, extracting a second edge image from the reconstructed image with an edge extractor, smoothing the first edge image and the second edge image, discriminating between the reconstructed image and an original image corresponding to the first edge image with a discriminator to obtain an adversarial loss, and training the generator by using an edge loss and the adversarial loss, the edge loss being calculated from the smoothed first edge image and the smoothed second edge image.

20 Claims, 11 Drawing Sheets

(56) References Cited

OTHER PUBLICATIONS

Shilei, Cao, Danilo Vasconcellos Vargas, and Kouichi Sakurai. "Generative Face Completion via edge learning and semantic attention." (Year: 2020).*

Zhai, Mengyao, et al. "Lifelong gan: Continual learning for conditional image generation." Proceedings of the IEEE/CVF International Conference on Computer Vision. 2019. (Year: 2019).*

Zou, Heqing, Kenan E. Ak, and Ashraf A. Kassim. "Edge-gan: Edge conditioned multi-view face image generation." 2020 IEEE International Conference on Image Processing (ICIP). IEEE, 2020. (Year: 2020).*

Chen et al., "SketchyGAN: Towards Diverse and Realistic Sketch to Image Synthesis", 2018 Proceedings of the IEEE Conference on Computer Vision and Pattern Recognition. arXiv:1801.02753v2. Apr. 12, 2018. pp. 1-19.

Huang et al., "Multimodal Unsupervised Image-to-Image Translation", 2018 Proceedings of the European Conference on Computer Vision. arXiv:1804.04732v2. Aug. 14, 2018. pp. 1-23.

Isola et al., "Image-to-Image Translation with Conditional Adversarial Networks", 2017 Proceedings of the IEEE Conference on Computer Vision and Pattern Recognition. arXiv:1611.07004v3. Nov. 26, 2018. pp. 1-17.

Nayak, Manish, "Pix2Pix Network, An Image-To-Image Translation Using Conditional GANs (cGANs)", An Introduction to PIX2PIX CGANA Towards AI. https://medium.com/towards-artificial-intelligence/pix2pix-network-an-image-to-image-translation-using-conditional-gans-cgans-8a08b661d206. Nov. 5, 2019. pp. 1-4.

Park et al., "Semantic Image Synthesis with Spatially-Adaptive Normalization", 2019 Proceedings of the IEEE Conference on Computer Vision and Pattern Recognition. arXiv:1903.07291v2. Nov. 5, 2019. pp. 1-4.

Sung et al., "Image-to-Image Translation Using Identical-Pair Adversarial Networks", Applied Sciences. vol. 9. No. 13. Jan. 2019. pp. 1-15.

Zhu, et al., "Toward Multimodal Image-to-Image Translation", 31st Conference on Neural Information Processing Systems. Dec. 4-9, 2017. pp. 1-12.

Zhu et al., "Unpaired Image-to-Image Translation using Cycle-Consistent Adversarial Networks", 2017 Proceedings of the IEEE International Conference on Computer vision. arXiv:1703.10593v6. Nov. 15, 2018. pp. 1-18.

* cited by examiner

IMAGE RECONSTRUCTION BASED ON EDGE LOSS

BACKGROUND

Technical Field

The present invention relates to image reconstruction, and in particular to image reconstruction based on edge loss.

Description of the Related Art

Pix2Pix is a method for transforming an edge image to a color image. With Pix2Pix, it is sometimes difficult to translate edges drawn by a human due to over-fitting on a test set, which typically includes edge images generated by a machine edge extractor. As can be appreciated, many computational resources may be needed in order to improve the quality of the color image reconstructed from the edges.

SUMMARY

According to an aspect of the present invention, a computer-implemented method includes generating a reconstructed image from a first edge image with a generator, extracting a second edge image from the reconstructed image with an edge extractor, smoothing the first edge image and the second edge image, discriminating between the reconstructed image and an original image corresponding to the first edge image with a discriminator to obtain an adversarial loss, and training the generator by using at least an edge loss and the adversarial loss, the edge loss being calculated from the smoothed first edge image and the smoothed second edge image.

The foregoing aspect may also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the method.

The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
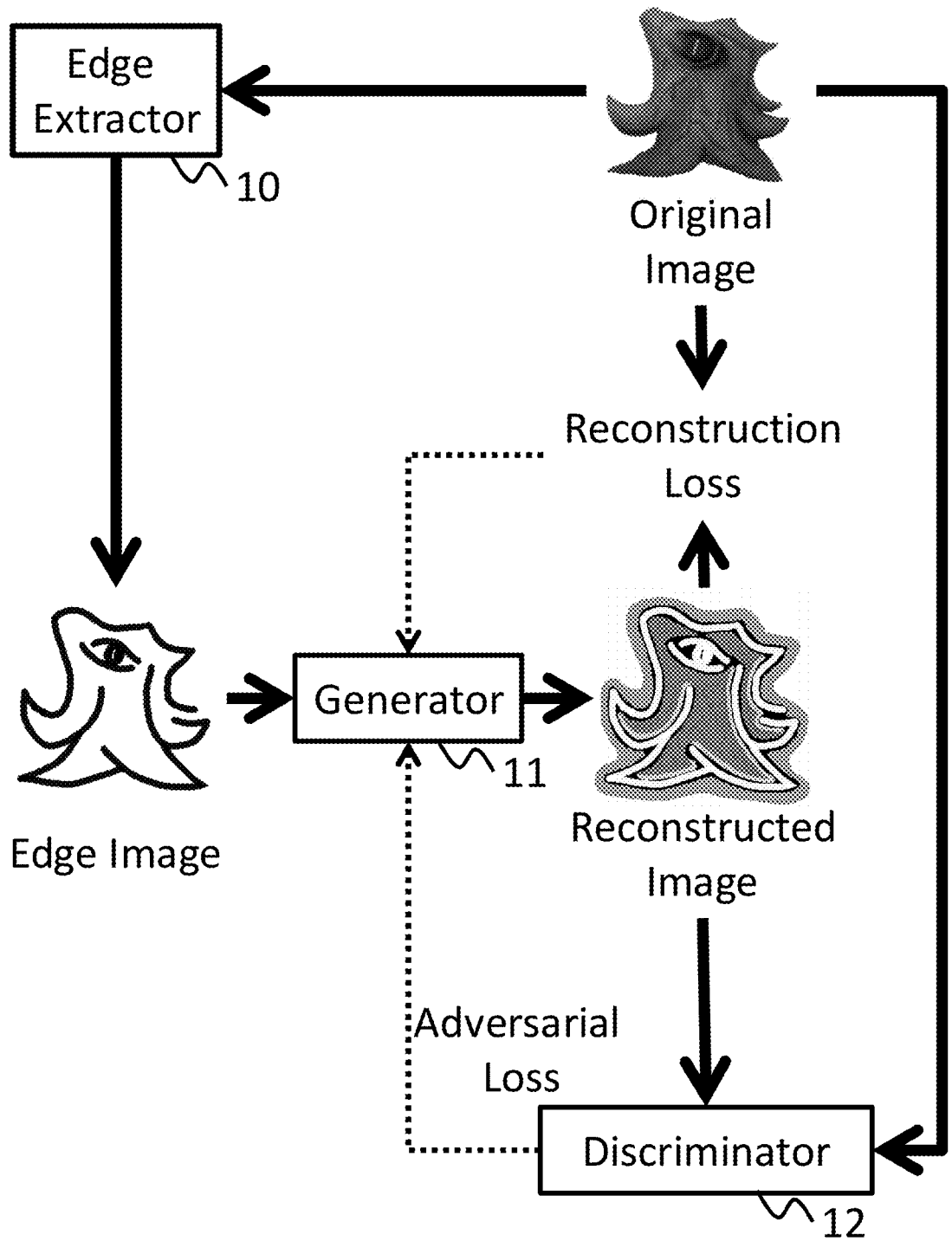
FIG. 1 shows an outline of an image reconstruction process according to an embodiment of a related invention.

FIG. 1 shows an outline of an image reconstruction process according to an embodiment of a related invention. The embodiment of FIG. 1 may relate to Pix2Pix. Pix2Pix utilizes a Generative Adversarial Network (GAN), in which a generator and a discriminator are adversarially trained.

In embodiments, an edge extractor 10 extracts an edge image from an original image, such as a color image. The generator 11 generates a reconstructed image from the edge image trying to restore the original image. A reconstructed loss is calculated from a difference between the original image and the reconstructed image. The discriminator 12 discriminates the original image from the input images.

The discriminator 12 outputs realism as a result of the discrimination. It is contemplated that when the realism is close to 1, the input image is discriminated as a true image, meaning that the input image is the original image. When the realism is close to 0, the input image is discriminated as a false image, meaning that the input image is not the original image.

An adversarial loss is calculated from the realism. In embodiments, for the reconstructed image (not the original image), the adversarial loss may include a value related to the realism (e.g., log(realism)). It is contemplated that for the original image, the adversarial loss may include a value related to 1−the realism (e.g., log(1−realism)) and the realism may be calculated from distance between the distribution of the original images and distribution of reconstructed images.

It is envisioned that the discriminator 12 may be trained such that the adversarial loss is minimized. The generator 11 is trained such that the adversarial loss is maximized and the reconstruction loss is minimized. In embodiments, the generator 11 and the discriminator 12 may be trained alternately.

In the embodiment of FIG. 1, it is contemplated that a quality of the reconstructed image generated from a human-drawn edge image may be low because of the difference between the edge image prepared by the edge extractor 10 and the human-drawn edge image. In this manner, the generator 11 may be over-fit with the edge image prepared by the edge extractor 10. The embodiments explained in relation to FIG. 1 are not intended as a prior art of the present invention, but as embodiments related to the present invention.

Figure 2:
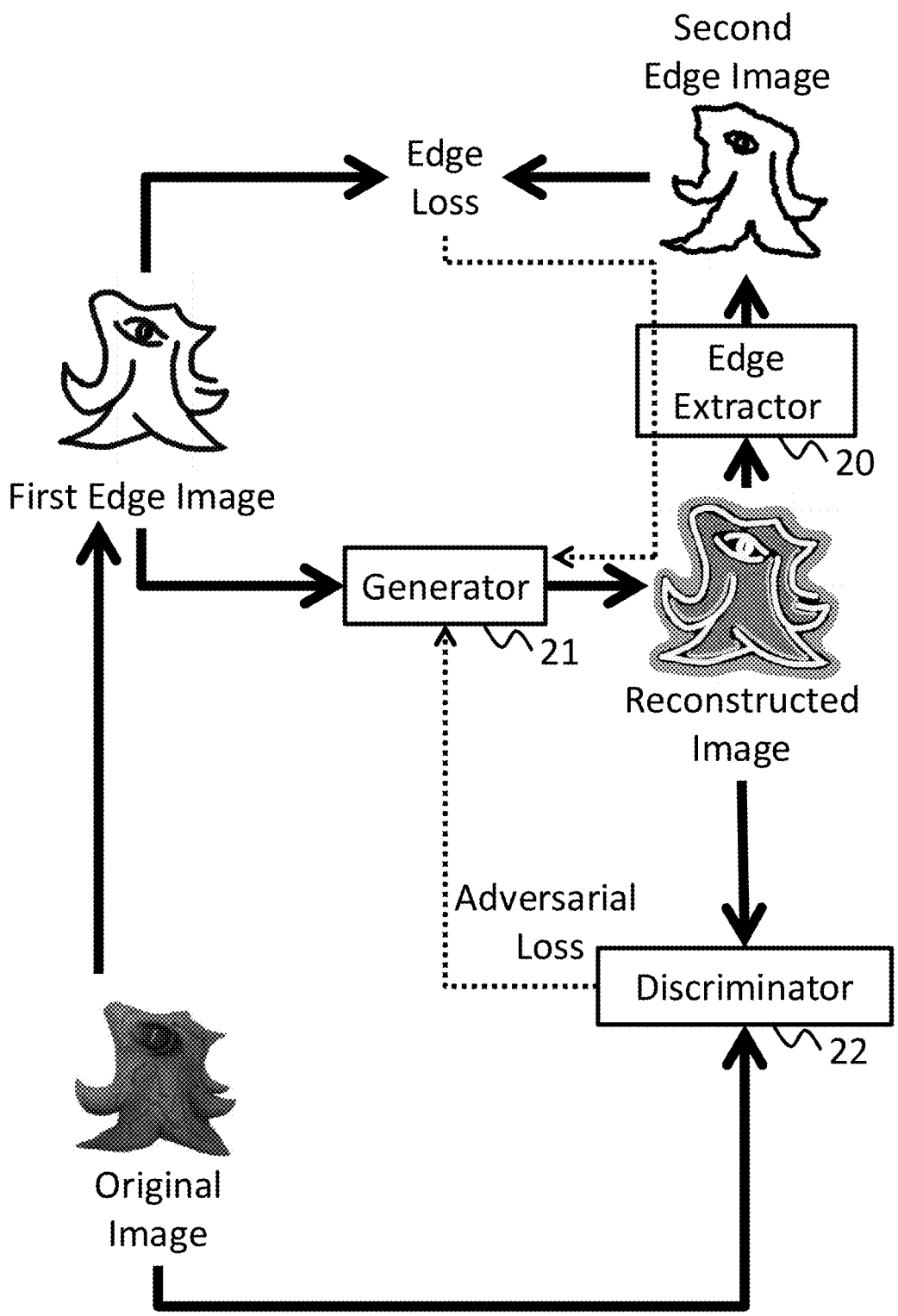
FIG. 2 shows an outline of image reconstruction process according to an embodiment of the present invention.

FIG. 2 shows an outline of image reconstruction process according to an embodiment of the present invention. A first edge image may correspond to an original image. In embodiments, an edge extractor 20 may extract the first edge image from the original image.

In embodiments, a generator 21 may generate a reconstructed image from the first edge image. The edge extractor 20 may extract edges of the reconstructed image to generate a second edge image. In one non-limiting embodiment, the edge extractor 20 may be differentiable. An edge loss may be calculated from a difference between the first edge image and the second edge image. It is contemplated that a discriminator 22 may be the same or similar to the discriminator 12 in FIG. 1.

The generator 21 is trained by using an adversarial loss from the discriminator 22 and the edge loss. In embodiments, the generator 21 may use the edge loss backpropagated from the edge extractor 20 or directly use the edge loss, for the training.

With continued reference to FIG. 2, GAN is performed in a circular way. In embodiments, the generator 21 may be trained with the edge loss rather than the reconstruction loss. As can be appreciated, due to the use of the edge loss, the generator 21 may be robust against the difference of type of input edge images. In this manner, the generator 21 may generate, from a human-drawn edge image, the reconstructed image that has a higher quality than generated by the generator 11.

Figure 3:
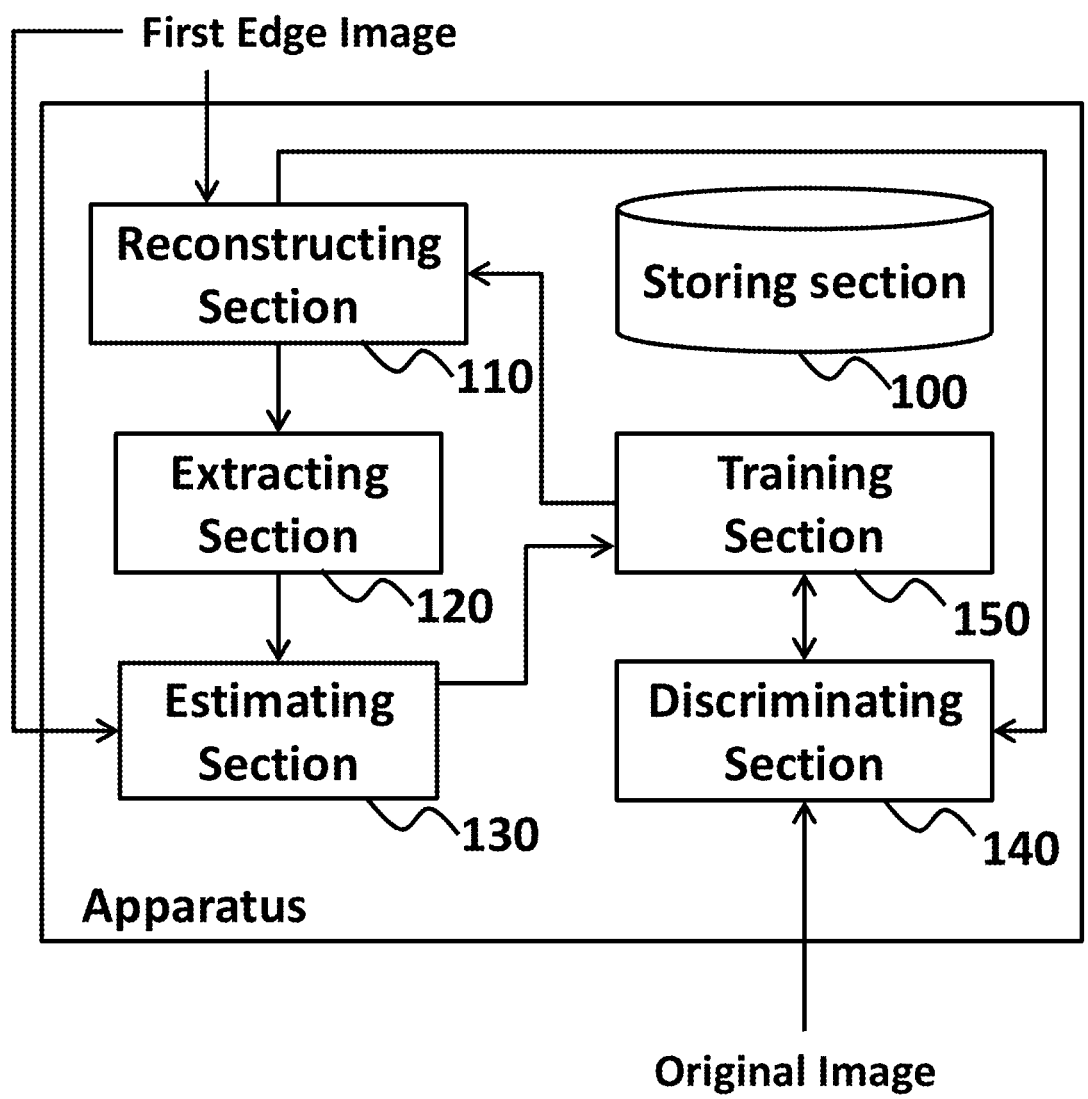
FIG. 3 shows a configuration of an apparatus according to an embodiment of the present invention.

FIG. 3 illustrates a configuration of an apparatus 60 according to an embodiment of the present invention. The apparatus 60 may train a generator and a discriminator, and generate a reconstructed image from an edge image with less computational resources.

In embodiments, the apparatus 60 may include a processor and/or programmable circuitry. The apparatus 60 may also include one or more computer readable mediums collectively including instructions. It is contemplated that the instructions may be embodied on the computer readable medium and/or the programmable circuitry. The instructions, when executed by the processor or the programmable circuitry, may cause the processor or the programmable circuitry to operate as a plurality of operating sections.

In this manner, the apparatus 60 may be regarded as including a storing section 100, a reconstructing section 110, an extracting section 120, an estimating section 130, a discriminating section 140, and a training section 150.

The storing section 100 stores information used for the processing that the apparatus 60 performs. In embodiments, the storing section 100 may also store a variety of data/instructions used for operations of the apparatus 60.

It is envisioned that one or more other elements in the apparatus 60 (e.g., the reconstructing section 110, the extracting section 120, the estimating section 130, the discriminating section 140, and the training section 150) may communicate data directly or via the storing section 100, as necessary.

The storing section 100 may be implemented by a volatile or non-volatile memory of the apparatus 60. In embodiments, the storing section 100 may store an original image, a reconstructed image, a first edge image, a second edge image, an edge loss, an adversarial loss, a reconstruction loss, and other parameters and data related thereto.

In embodiments, the reconstructing section 110 may generate a reconstructed image from a first edge image as a generator such as the generator 21. The reconstructing section 110 may provide the extracting section 120 and the discriminating section 150 with the reconstructed image.

It is contemplated that the extracting section 120 may extract a second edge image from the reconstructed image as an edge extractor such as the edge extractor 20. The extracting section 120 may provide the estimating section 130 with the second edge image.

In embodiments, the estimating section 130 may calculate an edge loss from the first edge image and the second edge image. In one non-limiting embodiment, the estimating section 130 may smooth the first edge image and the second edge image and calculate the edge loss from the smoothed first edge image and the smoothed second edge image. The estimating section 130 may provide the training section 150 with the edge loss.

The discriminating section 140 may discriminate between the reconstructed image and an original image corresponding to the first edge image as a discriminator such as the discriminator 22. In embodiments, the discriminating section 140 may calculate an adversarial loss as a result of the discrimination. The discriminating section 140 may provide the training section 150 with the adversarial loss.

The training section 150 may train the generator and the discriminator. In one non-limiting embodiment, the training section 150 may train the generator by using at least the edge loss and the adversarial loss. In embodiments, the training section 150 may train the discriminator by using at least the adversarial loss.

Figure 4:
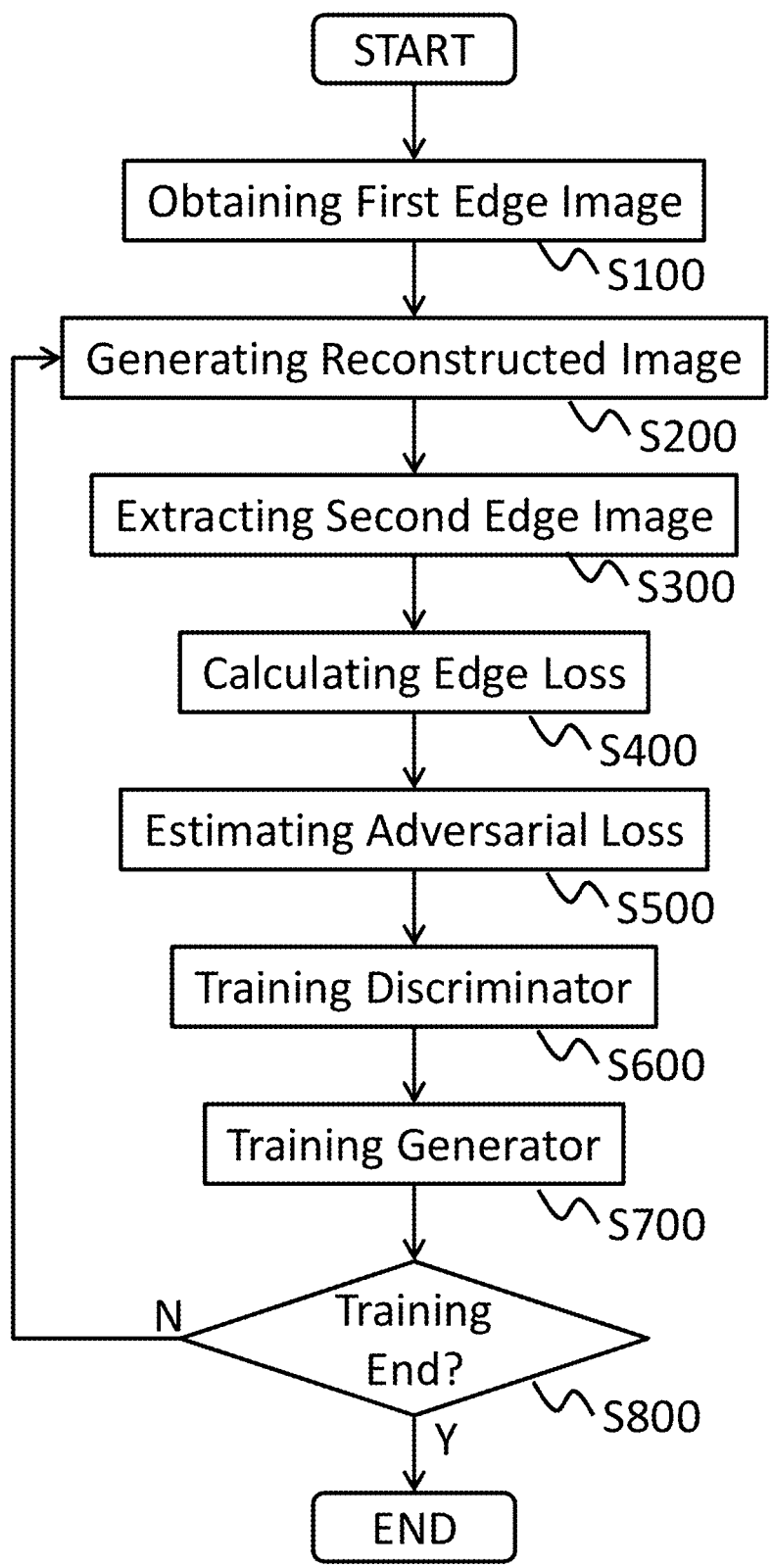
FIG. 4 shows an operational flow diagram according to an embodiment of the present invention.

FIG. 4 shows an operational flow diagram according to an embodiment of the present invention. The present embodiment describes an example in which an apparatus, such as the apparatus 60, performs operations from S100 to S800, as shown in FIG. 4, to train the generator and the discriminator.

At S100, a reconstructing section such as the reconstructing section 110 may obtain a first edge image. In one non-limiting embodiment, an extracting section such as the extracting section 120 may extract edges from an original image to generate the first edge image. In embodiments, any known edge generator may generate the first edge image from the original image. In embodiments, the first edge image may be drawn by a human in reference to the original image.

The original image may be contrary to an edge image, which consists only of edges. In a specific embodiment, the original image may be in color or gray scale. It is contemplated that the original image may be an RGB image.

At S200, a reconstructing section such as the reconstructing section 110 may generate a reconstructed image from the first edge image. In embodiments, the reconstructing section may use a neural network (e.g., convolutional neural network) as the generator for the generation of the reconstructed image.

At S300, the extracting section may extract edges from the reconstructed image to generate a second edge image. In embodiments, the extracting section may use a neural network (e.g., a neural network) as a differentiable edge extractor.

At S400, an estimating section such as the estimating section 130 may calculate an edge loss between the first edge image and the second edge image. In embodiments, the edge loss may be the difference between the first edge image and the second edge image.

In embodiments, the estimating section may calculate the edge loss between smoothed edge images. It is contemplated that the estimating section may smooth the first edge image and the second edge image and calculate the edge loss from the smoothed first edge image and the smoothed second edge image. In one non-limiting embodiment, the estimating section may use Gaussian filter for smoothing the first and second edge loss. In embodiments, the apparatus may improve robustness of the generator relating to pixel shifts in edge images.

At S500, a discriminating section such as the discriminating section 140 may estimate an adversarial loss. In embodiments, the discriminating section may input each of the reconstructed image and the original image corresponding thereto, and output the realism of each image. In one non-limiting embodiment, the discriminating section may use a neural network (e.g., convolutional neural network) as the discriminator.

As can be appreciated, the discriminating section may estimate an adversarial loss based on the realism of each image. In embodiments, the discriminating section may estimate the adversarial loss based on log (realism of the original image) and log (1-realism of the reconstructed image).

At S600, a training section such as the training section 150 may train the discriminator by using the adversarial loss. In embodiment, the training section may train the convolutional neural network of the discriminator such that the adversarial loss is maximized. In one non-limiting embodiment, the training section may train the discriminator by stochastic gradient descent.

At S700, the training section 150 may train the generator by using the edge loss and the adversarial loss. In embodiments, the training section may train the convolutional neural network of the generator such that a sum or a weighted sum of the edge loss and the adversarial loss is minimized. In one non-limiting embodiment, the training section may train the generator by stochastic gradient descent.

In embodiments, the training section may use the edge loss backpropagated from the edge extractor. It is contemplated that the edge extractor may be differentiable, and thereby the edge extractor may transform an error of output into an error of input. As can be appreciated, since the edge extractor is differentiable, the training section may train the generator and the edge extractor in a circular way.

It is envisioned that the edge extractor may be a neural network or Sobel generator. In embodiments, the training section may backpropagate the edge loss to the edge extractor and then backpropagate the edge loss from the edge extractor to the generator as shown in FIG. 2. In one non-limiting embodiment, only nodes of the generator may be updated, and nodes of the edge extractor may not be updated.

Although generally described as being performed after the operation of S600, it is contemplated that the operation of S700 may be performed before the operation of S600.

At S800, the training section may determine whether to end the training of the generator and the discriminator. It is contemplated that the training section may use a known end condition of GAN at S800. In embodiments, the training section may end the training when realism of the original image is close to 1 and/or realism of the reconstructed image is close to 0.5. In one non-limiting embodiment, the training section may end the training when a predetermined time has passed or predetermined iterations of S200-S800 have been performed.

It is envisioned that after the operation of S800, the reconstructing section may generate reconstructed images from a third edge image with the trained generator. In embodiments, the third edge image may be human-drawn, generated by an edge extractor such as the edge extractor 20, or generated by a known other edge extractor.

According to the embodiments related to FIGS. 2-4, the apparatus may train the generator by using at least the edge loss. In this manner, the generator may generate a plausible reconstructed image that may resemble the original image from an edge image with less computational resource, even if the edge image is human-drawn.

Figure 5:
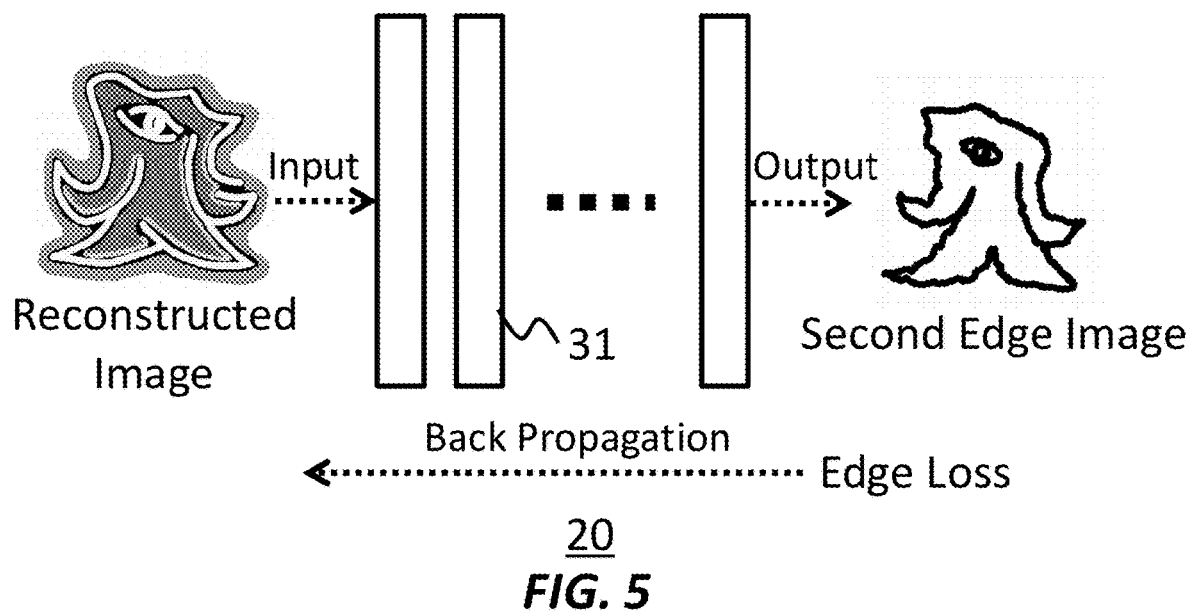
FIG. 5 shows an edge extractor according to an embodiment of the present invention.

FIG. 5 illustrates an edge extractor, such as the edge extractor 20, according to an embodiment of the present invention. It is contemplated that the extracting section may use the edge extractor of FIG. 5 at the operations of at least one of S100 and S300 in FIG. 4.

In embodiments, the edge extractor 20 may include a plurality of layers 31 of a neural network. The edge extractor 20 may input the reconstructed image, and extract edges of the reconstructed image to output the second edge image at S300. In one non-limiting embodiment, the edge extractor 20 may extract edges forming outer lines of an image. In embodiments, the edge extractor 20 may further extract edges existing inside the outer lines of the image.

It is envisioned that the edge extractor 20 may also input the edge loss from the last layer, and backpropagate the edge loss from the last layer to the first layer at S700. Then, the edge extractor 20 may provide the generator (e.g., the generator 21) with the backpropagated edge loss.

Figure 6:
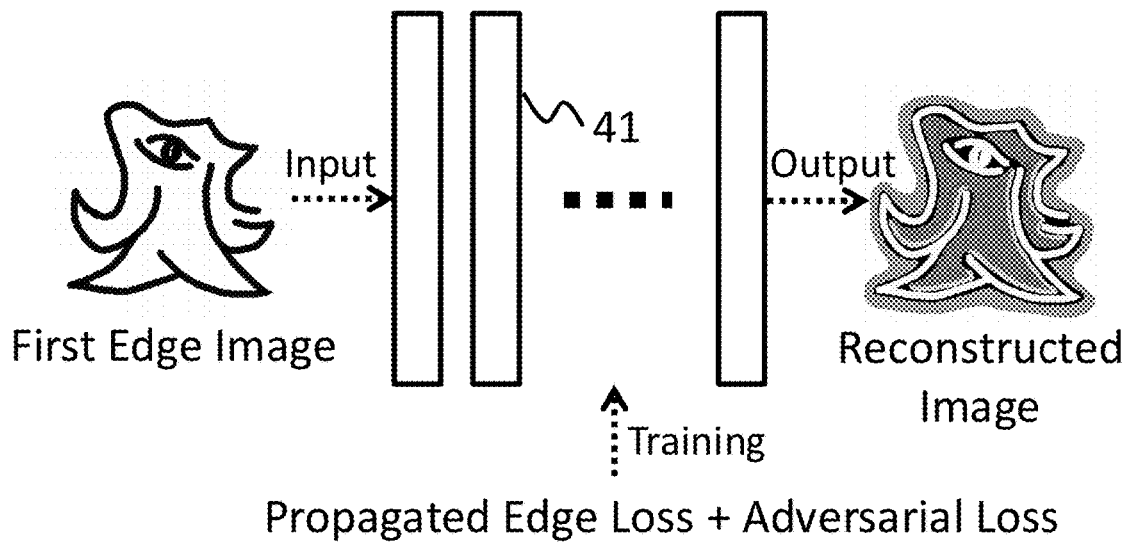
FIG. 6 shows a generator according to an embodiment of the present invention.

FIG. 6 shows a generator, such as the generator 21, according to an embodiment of the present invention. It is contemplated that the reconstructing section may use the generator of FIG. 6 in the operations of S200 in FIG. 4.

In embodiments, the generator 21 may include a plurality of layers 41 of the neural network. The generator 21 may input an edge image, such as the first edge image, and try to reconstruct an original image from the first edge image to output the reconstructed image at S200.

In an embodiment, the reconstructed image may be in color or gray scale. In the embodiment, the generator 21 may generate the reconstructed image in the same manner as the original image. In this manner, when the original image is in color, the generator 21 may generate the reconstructed image in color.

The generator 21 may be trained with at least the edge loss and the adversarial loss. In embodiments, the training section may train the generator 21 with the adversarial loss and the edge loss backpropagated from the edge extractor 20 at S700.

In embodiments, the training section may train the generator 21 with a reconstruction loss between the reconstructed image and the original image, in addition to the adversarial loss and the edge loss. In one non-limiting embodiment, the training section may use a weighted sum of the adversarial loss, the edge loss, and the reconstruction loss.

In embodiments, an estimating section, such as the estimating section 130 may estimate the reconstruction loss. According to the embodiment using the reconstruction loss, it is contemplated that the generator 21 may generate the reconstructed image so as to restore colors of the original image more accurately.

Figure 7:
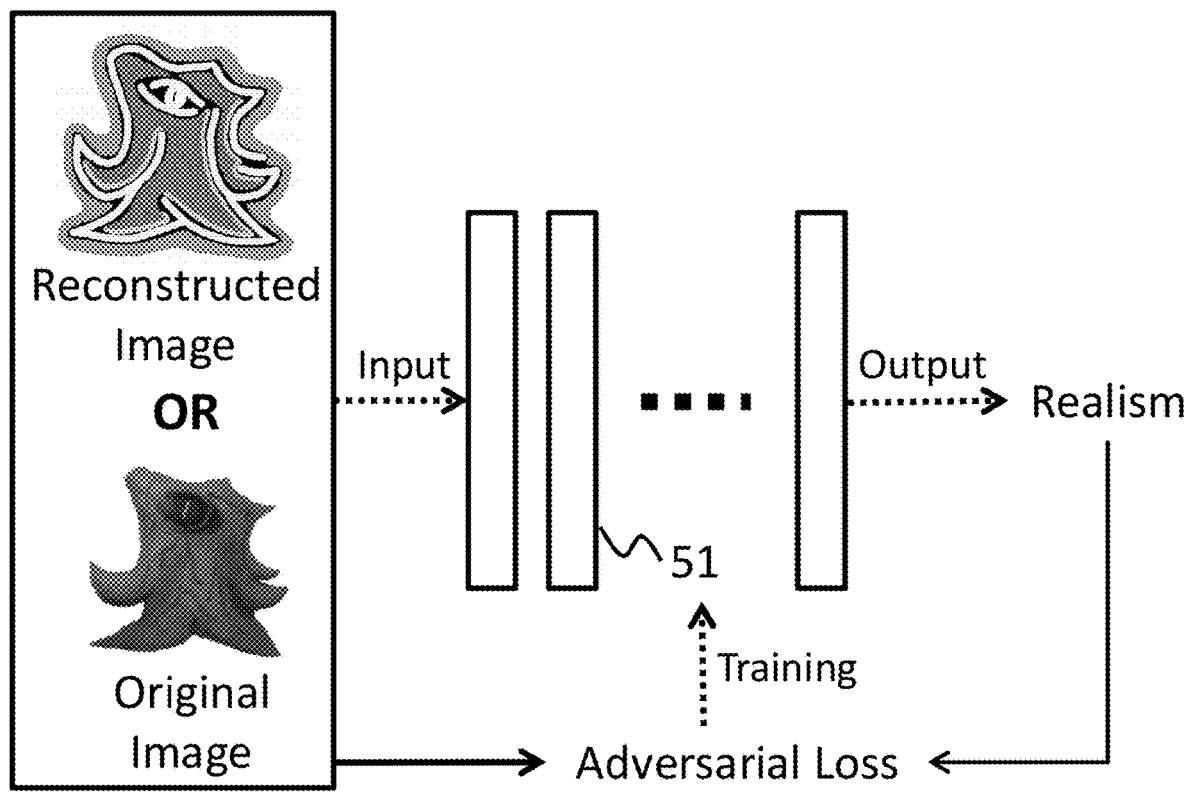
FIG. 7 shows a discriminator according to an embodiment of the present invention.

FIG. 7 shows a discriminator, such as the discriminator 22, according to an embodiment of the present invention. It is envisioned that the discriminating section may use the discriminator 22 of FIG. 7 at the operations of S500 in FIG. 4.

The discriminator 22 may include a plurality of layers 51 of neural network. In embodiments, the discriminator 51 may input the reconstructed image or the original image, and output realism indicating that the input image is original or not at S500. It is contemplated that the training section may train the discriminator 22 with the adversarial loss at S700.

Figure 8:
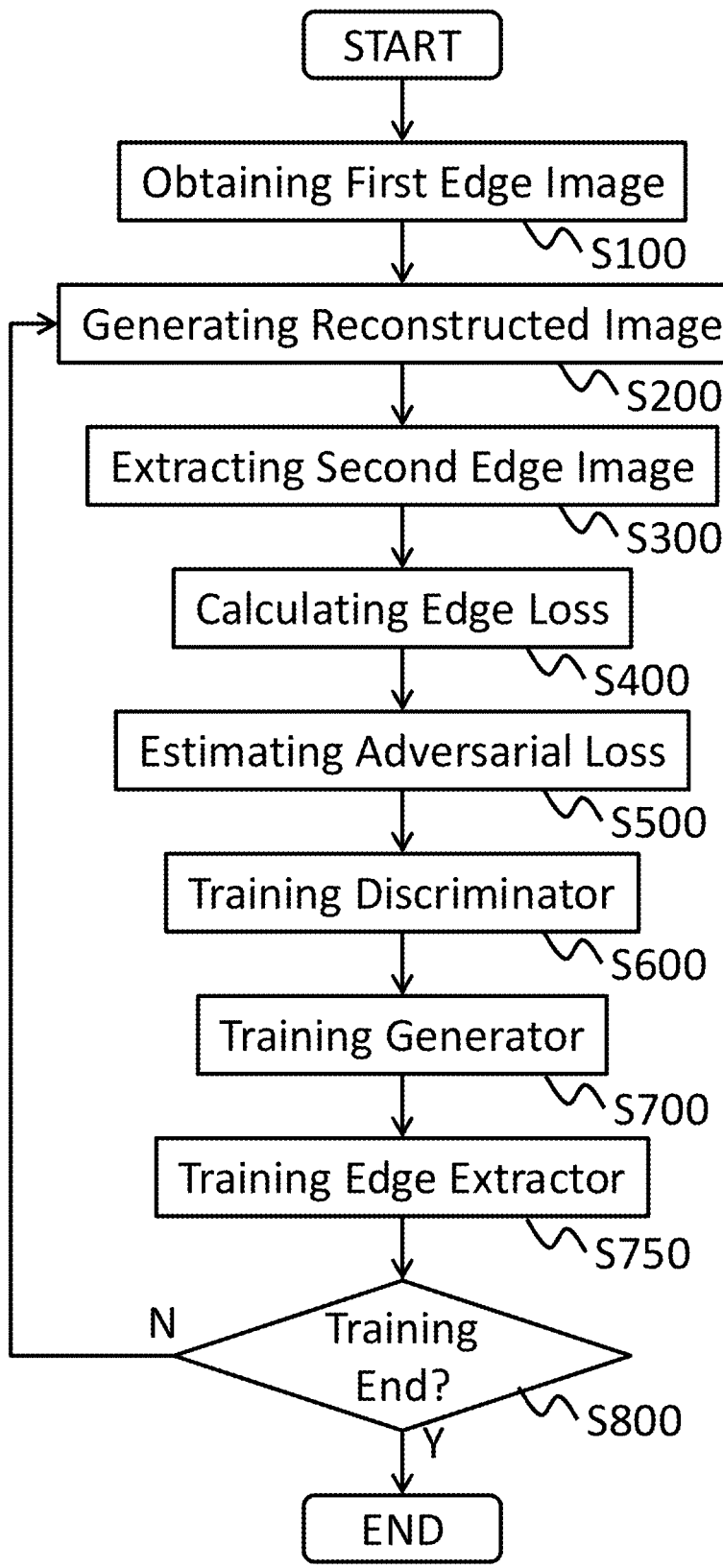
FIG. 8 shows another operational flow diagram according to an embodiment of the present invention.

FIG. 8 shows another operational flow diagram according to an embodiment of the present invention. The present embodiment describes an example in which an apparatus, such as the apparatus 60, performs operations from S100 to S800, as shown in FIG. 8, to train the generator and the discriminator.

It is contemplated that the operations of S100, S200, S300, S400, S500, S600, S700 and S800 may be the same or similar to the operations explained in relation to FIG. 4. In the embodiment of FIG. 8, an operation of S750 may be performed during the iteration of S200-S800.

At S750, the training section may train the edge extractor by using at least one of the edge loss and the adversarial loss. It is contemplated that the training section may train a neural network of the edge extractor such that a sum or a weighted sum of the edge loss and the adversarial loss is minimized. In embodiments, the training section may train the neural network of the edge extractor such that a sum or a weighted sum of the edge loss, the adversarial loss, and the reconstruction loss is minimized. In one non-limiting embodiment, the training section may train the neural network of the edge extractor such that the edge loss is minimized.

It is envisioned that during the training of the edge extractor, the training section may not update the generator. In embodiments, the training section may train the edge extractor by stochastic gradient descent.

In the embodiment of FIG. 8, the operation of S750 is performed after the operation of S700, which is performed after the operation of S600. However, it is contemplated that the operations of S600, S700, and S750 may be performed in any different order.

Figure 9:
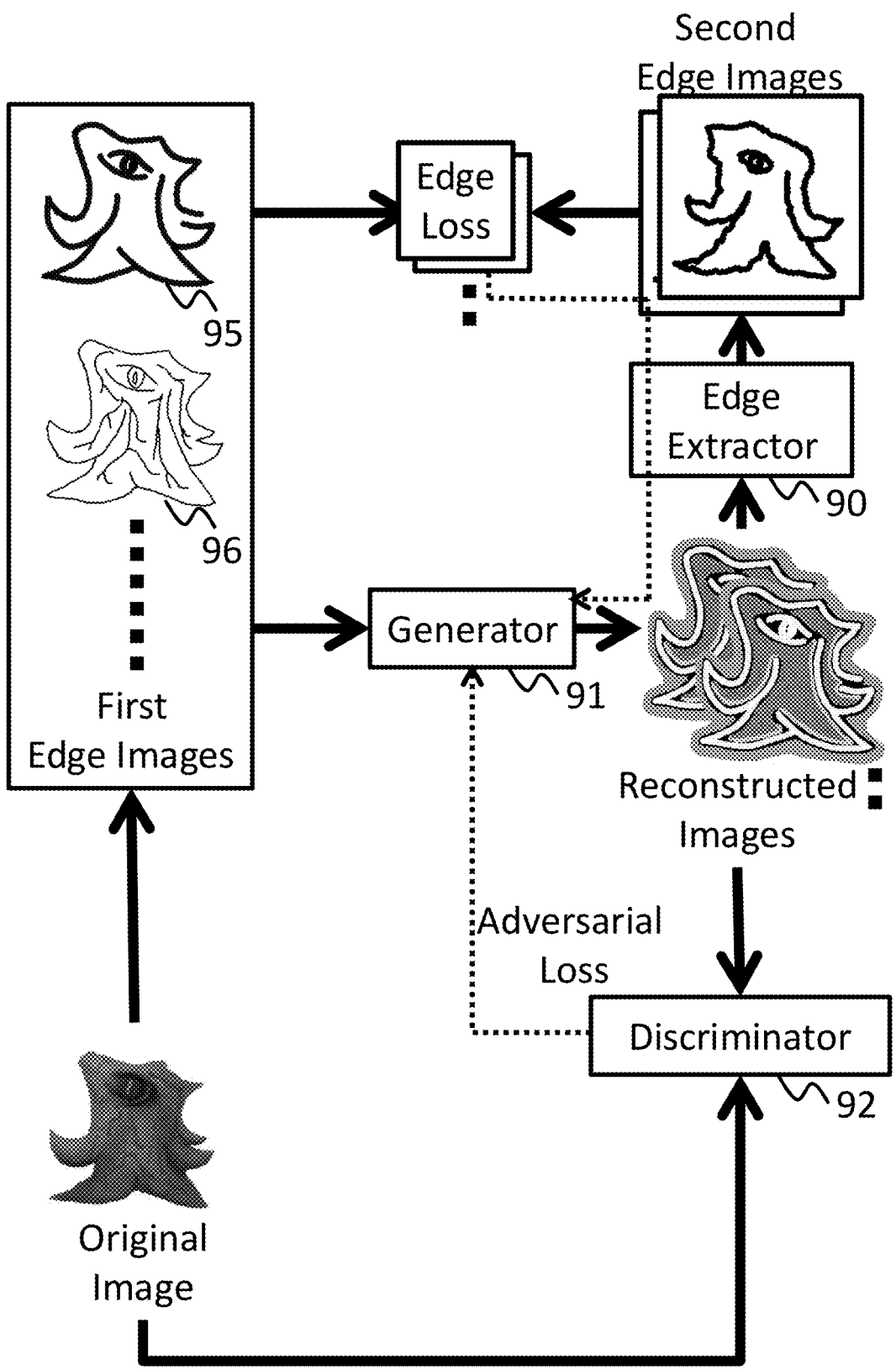
FIG. 9 shows an outline of another image reconstruction process according to another embodiment of the present invention.

FIG. 9 shows an outline of an image reconstruction process according to another embodiment of the present invention. In embodiments, a plurality of first edge images may be prepared. In one non-limiting embodiment, an edge extractor 90, which may correspond to the edge extractor 20, may extract the plurality of first edge images from an original image, such that each of the plurality of first edge images may have a unique type.

In embodiments, a first edge image of one type 95 may be formed of outer lines of the original image. In one non-limiting embodiment, a first edge image of another type 96 may be formed of outer lines of the original image and inner lines of the original image.

It is contemplated that in the embodiment of FIG. 9, a generator 91, which may correspond to the generator 21, may generate the reconstructed images from the plurality of first edge images. The edge extractor 90 may extract edges of the reconstructed images to generate a plurality of second edge images. The estimating section may estimate a plurality of edge losses between the plurality of the first edge images and the plurality of second edge images. In an embodiment, the estimating section may estimate each edge loss of the plurality of edge losses from a corresponding pair of the first edge image and the second edge image.

In embodiments, the training section may train the discriminator 92 with the adversarial loss. The training section may train the generator 91 by using at least one of the plurality of edge losses and an adversarial loss output from a discriminator 92, which may correspond to the discriminator 22.

In an embodiment, the training section may calculate an average of the plurality of edge losses and use the average for the training of the generator 91. In one non-limiting embodiment, the training section may select one (e.g., the smallest or the largest one) of the plurality of edge losses and use the selected one for the training of the generator 91.

Figure 10:
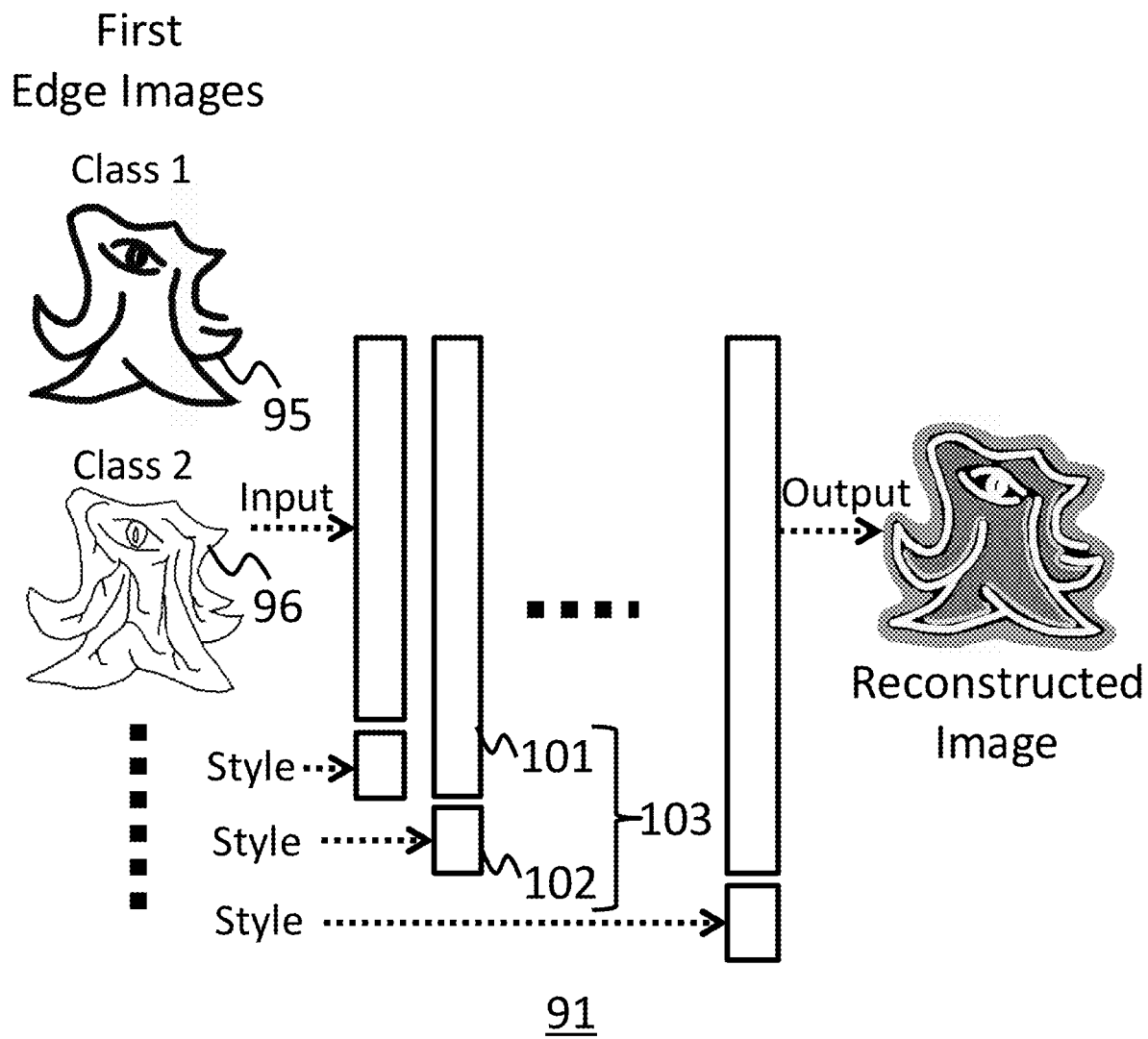
FIG. 10 shows of another generator according to an embodiment of the present invention.

FIG. 10 illustrates the generator 91 in FIG. 9 according to an embodiment of the present invention. It is contemplated that the generator 91 may be a generator of a style GAN configured for input of a style of the plurality of first edge images in addition to the first edge image. The first edge images having a different type may be identified with a different class. In embodiments, the first edge image 95 may belong to class 1 and the first edge image 96 may belong to class 2.

In embodiments, the generator 91 may comprise a plurality of layers 103 of a neural network. Each of the plurality of layers 103 may include one or more usual nodes 101 and one or more style nodes 102. The style node 102 may accept input of a style of the first edge image in the style GAN. In embodiments, the style node 102 may accept input of the style in each of the plurality of layers 103. In another embodiment, the style node 102 may accept input of the style in some (e.g., initial one or two layers) of the plurality of layers 103.

It is envisioned that the style node 102 may input an attribute of the original image as the style. The attribute may include characteristics of a subject of the original image. In embodiments, the attribute may include at least one of material, design, atmosphere, category, name, size, weight, etc. In one non-limiting embodiment, when the original image is an image of shoes, the attribute may include a material (e.g., leather, fabric, or plastic) and a design (e.g., dress shoes, sneakers, or slip-on).

Figure 11:
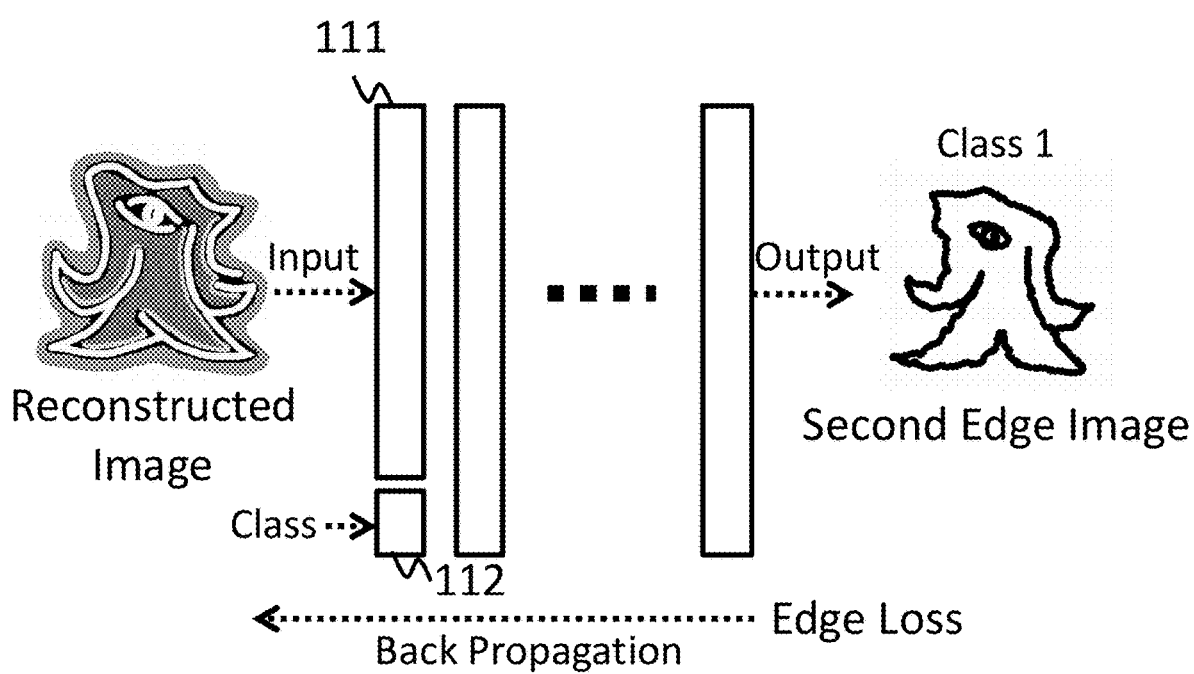
FIG. 11 shows another edge extractor according to an embodiment of the present invention.

FIG. 11 shows an edge extractor, such as the edge extractor 90 in FIG. 9, according to an embodiment of the present invention. The edge extractor 90 may input each of the plurality of reconstructed images, and output a second edge image. The edge extractor 90 may comprise a plurality of layers of neural network.

In embodiments, the edge extractor 90 may be configured for input of the reconstructed image and a class of the first edge image that is used for generation of the reconstructed image.

It is contemplated that the edge extractor 90 may be configured for input Class 1 with a reconstructed image that is generated from the first edge image 95, and may be trained to generate an edge image of Class 1 (e.g., by extracting only outlines of the reconstructed image). In embodiments, the edge extractor 90 may also be configured for input Class 2 with a reconstructed image that is generated from the first edge image 96, and may be trained to generate an edge image of Class 2 (e.g., by extracting not only outlines but also inner lines of the reconstructed image).

In embodiments, the edge extractor 90 may be configured for input of a reconstructed image and a class that is different from the class of the first edge image that is used for generation of the reconstructed image. It is contemplated that the edge extractor 90 may be configured for input Class 2 with a reconstructed image that is generated from the first edge image 95 and to input Class 1 with a reconstructed image that is generated from the first edge image 96. In one non-limiting embodiment, the edge extractor 90 may not include the class node 112 to input class.

In embodiments, the edge extractor 90 may be configured for input of the class in a class node 112 in an initial layer 111 of the edge extractor 90. In embodiments, the edge extractor 90 may be configured for input of the class in one or more class nodes in one or more subsequent layers.

With reference to FIGS. 9-11, it is contemplated that the generator may be trained so as to handle different types of edge images, and more accurately restore an original image from a variety of human-drawn edge images.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
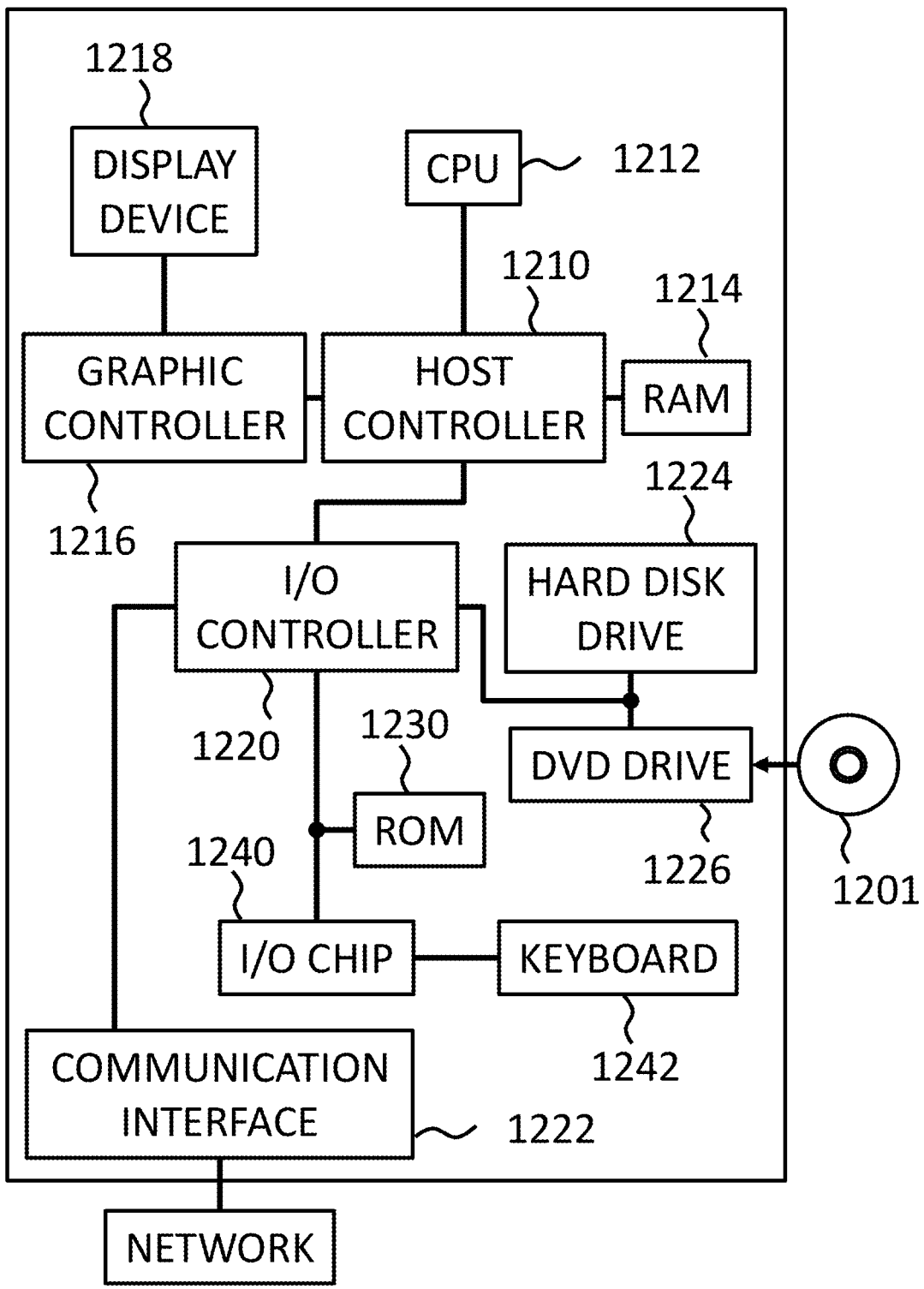
FIG. 12 shows a hardware configuration of a computer that functions as a system according to an embodiment of the present invention.

FIG. 12 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Many of the embodiments of the present invention include artificial intelligence, machine learning, and model training in particular. A model usually starts as a configuration of random values. Such untrained models must be trained before they can be reasonably expected to perform a function with success. Many of the processes described herein are for the purpose of training models for image reconstruction based on edge loss. Once trained, a model can be used for image reconstruction based on edge loss, and may not require further training. In this way, a trained model is a product of the process of training an untrained model.

What is claimed is:

1. A computer-implemented method comprising:
generating a reconstructed image from a first edge image with a generator;
extracting a second edge image from the reconstructed image with an edge extractor;
smoothing the first edge image and the second edge image;
discriminating between the reconstructed image and an original image corresponding to the first edge image with a discriminator to obtain an adversarial loss; and
training the generator by using at least an edge loss and the adversarial loss, the edge loss being calculated from the smoothed first edge image and the smoothed second edge image.

2. The method of claim 1, further comprising:
generating another reconstructed image from a third edge image with the trained generator.

3. The method of claim 1, wherein the edge extractor is differentiable.

4. The method of claim 3, wherein the edge extractor includes a neural network.

5. The method of claim 4, wherein training the generator includes using the edge loss backpropagated from the edge extractor.

6. The method of claim 5, further comprising training the edge extractor by using at least the edge loss and the adversarial loss.

7. The method of claim 1, further comprising training the discriminator by using at least the adversarial loss.

8. The method of claim 1, wherein generating the reconstructed image includes generating reconstructed image from a plurality of first edge images, each of the plurality of first edge images having a unique type.

9. The method of claim 8, wherein the generator is a generator of a style GAN configured to receive a style of the plurality of first edge images.

10. The method of claim 9, wherein the edge extractor is a neural network configured to receive the reconstructed image and a class of the first edge image that is used for generation of the reconstructed image.

11. The method of claim 1, wherein the reconstructed image and the original image are in color or gray scale.

12. An apparatus comprising:
a processor or programmable circuitry; and
one or more computer readable mediums collectively including instructions that, when executed by the processor or the programmable circuitry, cause the processor or the programmable circuitry to perform operations including:
generating a reconstructed image from a first edge image with a generator;
extracting a second edge image from the reconstructed image with an edge extractor;
smoothing the first edge image and the second edge image;
discriminating between the reconstructed image and an original image corresponding to the first edge image with a discriminator to obtain an adversarial loss; and
training the generator by using at least an edge loss and the adversarial loss, the edge loss being calculated from the smoothed first edge image and the smoothed second edge image.

13. The apparatus of claim 12, wherein the operations further comprise:
generating a reconstructed image from a third edge image with the trained generator.

14. The apparatus of claim 12, wherein the edge extractor is differentiable.

15. The apparatus of claim 14, wherein the edge extractor includes a neural network.

16. The apparatus of claim 15, wherein training the generator includes using the edge loss backpropagated from the edge extractor.

17. A computer program product including one or more computer readable storage mediums collectively storing program instructions that are executable by a processor or programmable circuitry to cause the processor or programmable circuitry to perform operations comprising:
generating a reconstructed image from a first edge image with a generator;
extracting a second edge image from the reconstructed image with an edge extractor;
smoothing the first edge image and the second edge image;
discriminating between the reconstructed image and an original image corresponding to the first edge image with a discriminator to obtain an adversarial loss; and
training the generator by using at least an edge loss and the adversarial loss, the edge loss being calculated from the smoothed first edge image and the smoothed second edge image.

18. The computer program product of claim 17, wherein the operations further comprise:
generating another reconstructed image from a third edge image with the trained generator.

19. The computer program product of claim 17, wherein the edge extractor is differentiable.

20. The computer program product of claim 19, wherein the edge extractor includes a neural network.

* * * * *